US006579200B2

(12) United States Patent
Wakabayashi

(10) Patent No.: US 6,579,200 B2
(45) Date of Patent: Jun. 17, 2003

(54) SILENT CHAIN WITH A GUIDE WASHER HAVING A SINGLE APERTURE FOR A ROCKER JOINT PIN

(76) Inventor: Shozo Wakabayashi, 1300-50, Yabata, Nabari, Mie (JP), 518-0495

( * ) Notice: Subject to any disclaimer, the term of this patent is extended or adjusted under 35 U.S.C. 154(b) by 29 days.

(21) Appl. No.: 09/776,342

(22) Filed: Feb. 2, 2001

(65) Prior Publication Data
US 2001/0019976 A1 Sep. 6, 2001

(30) Foreign Application Priority Data
Feb. 24, 2000 (JP) ........................................ 2000-047524

(51) Int. Cl.$^7$ ................................................ F16G 13/04
(52) U.S. Cl. ........................ 474/214; 474/213; 474/215; 59/78
(58) Field of Search ................................ 474/212–215, 474/228, 229, 230–233, 216–217, 220–223, 206, 207, 211; 59/4, 78, 5

(56) References Cited

U.S. PATENT DOCUMENTS

| | | | | |
|---|---|---|---|---|
| 1,598,906 A | * | 9/1926 | Dull | 474/214 |
| 2,525,561 A | | 10/1950 | Pierce | 74/251 |
| 2,602,344 A | | 7/1952 | Bremer | 74/250 |
| 2,775,156 A | * | 12/1956 | Imse et al. | 474/231 |
| 3,213,699 A | * | 10/1965 | Terepin | 474/215 |
| 3,877,688 A | * | 4/1975 | McCarty | 474/220 |
| 4,041,790 A | * | 8/1977 | Paul | 474/220 |
| 5,176,584 A | * | 1/1993 | Ishida et al. | 474/213 |
| 5,345,753 A | | 9/1994 | Okuda et al. | 59/5 |
| 5,445,570 A | | 8/1995 | White | 474/213 |
| 5,464,374 A | | 11/1995 | Mott | 474/224 |
| 5,651,746 A | * | 7/1997 | Okuda | 474/215 |
| 6,186,921 B1 | * | 2/2001 | Kotera | 474/215 |
| 6,260,345 B1 | * | 7/2001 | Kanehira et al. | 474/215 |

FOREIGN PATENT DOCUMENTS

| | | |
|---|---|---|
| JP | 61105328 | 5/1986 |
| JP | 62-132052 A * | 6/1987 |
| JP | 531238 A * | 11/1993 |

OTHER PUBLICATIONS

European Search Report, Appln. No. 01301526.8, Applicant: Borg–Warner Automotive K.K., 3 pages.

* cited by examiner

Primary Examiner—Marcus Charles

(57) ABSTRACT

A silent chain includes guide washers to prevent bending of the connecting pins during prestressing. The chain has multiple link plates, each with a pair of teeth and pin apertures. The links are interleaved in the transverse and longitudinal directions and are connected pivotally by connecting pins. The connecting pin is composed of a joint pin that is arcuate in cross-section and a rocker pin, which is shorter than the joint pin and arcuate in cross-section. A guide washer is provided for each connecting pin. The guide washer has guide parts that extend on both sides of the teeth of the link plate and includes a pin aperture for fixing the end of the joint pin.

8 Claims, 4 Drawing Sheets

SILENT CHAIN WITH A GUIDE WASHER HAVING A SINGLE APERTURE FOR A ROCKER JOINT PIN

The subject matter of this application relates to the subject matter of application Ser. No. 09/776,613, filed Feb. 2, 2001, entitled "A Silent Chain With A Guide Washer Having A Single Central Aperture For A Center Pin."

The present invention relates to a silent chain and, in particular, to the structure of a guide washer for a silent chain.

BACKGROUND OF THE INVENTION

A silent chain is used conventionally as a power transmission chain. An example of a typical silent chain is shown in FIGS. 5 and 6. As shown in the figures, silent chain 100 is composed of multiple link plates 102, each having a pair of teeth 121 interleaved in the transverse and longitudinal directions. These link plates 102 are connected pivotally by a connecting pin, composed of a pair of long and short joint-pins 131 and rocker pin 132, which are inserted in pin aperture 122 of link plate 102. Guide link 104 is placed on the outside of outermost link plate 102. Both ends of joint pin 131 are fixed to the pin aperture in guide link 104. Rigidity of guide link 104 is higher in general than that of link plate 102.

A prestressing load is applied to the silent chain in general, after its assembly. When an excessive load such as a prestressing load is applied to a conventional silent chain, a shear load from the link plate acts on the center of the joint pin while the stretching of the aperture pitch of the guide row is restricted because both ends of the joint pin are fixed to a guide link of high rigidity. Thereby, the bending load acts on the joint pin and, as a result, the center portions of the joint pin and rocker pin can bend.

This invention addresses such a conventional situation and it offers a silent chain that minimizes bending of the connecting pin.

SUMMARY OF THE INVENTION

In one embodiment, the present invention comprises a silent chain in which a guide washer is provided to each connecting pin and the end of the joint pin is fixed to the pin aperture of the guide washer. Thereby, stretching of the aperture pitch of the guide row is not restricted, even when an excessive tensile load, such as a prestressing load is applied to the chain and the shear load from the link plates acts on the joint pin and no bending load acts on the joint pin, so that bending of the joint pin and rocker pin is minimized or prevented.

The total length of the rocker pin is equal to or longer than the total width of the interleaved link plates and is shorter than the distance between the guide washers opposing in the chain width direction. That is, in this case, attachment of the guide washer is not impeded even if the total length of the rocker pin is longer than the total width of the laminated link plates because the guide washer is independently provided to each connecting pin. Thereby, the tolerance on the length of the rocker pin can be large to ease dimensional control, and the effective cross-section of the connecting pin can be uniform across the total width of the link plates because the total length of the rocker pin is longer than the total width of the link plates.

In a conventional silent chain, the guide link has a pair of pin apertures on both of its sides (see FIGS. 5 and 6). Therefore, the total length of the rocker pin is preferably shorter than the total width of the laminated link plates to permit unforced attachment of the guide link, even when the length of the rocker pin in one pin aperture is different from another rocker pin in another pin aperture.

In this case, the two ends of the rocker pin must not be too deep in the pin apertures in the outermost link plate so that the total length of the rocker pin needs to be as close as possible to the total width of the link plates. Because of the above reason, tolerance on the length of the rocker pin in a conventional silent chain is tight and dimensional control is not easy.

In the present invention, the guide washer can have a blade spring portion. In this case, the elastic force of the blade spring acts in the chain width direction so that frictional force is generated between adjacent link plates in the chain width direction. As a result, the bending resistance of the chain increases and chordal vibration of the chain is suppressed.

DETAILED DESCRIPTION OF THE PREFERRED EMBODIMENTS

A practical example of this invention is explained below with the aid of the attached figures.

Figure 1:
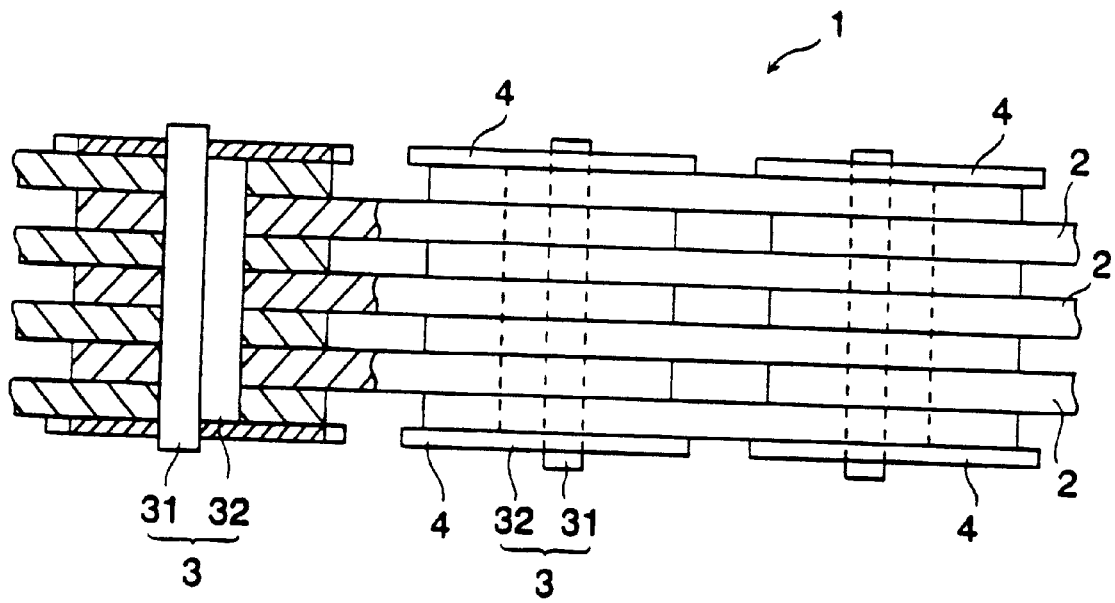
FIG. 1 is a side view of the silent chain of a first embodiment of the present invention.
Figure 2:
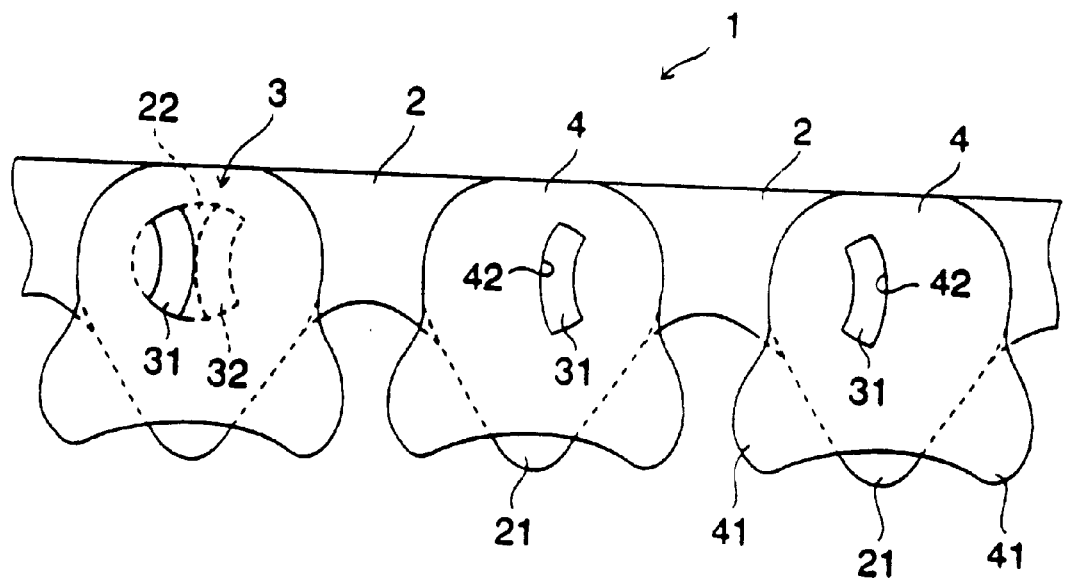
FIG. 2 is a front view of the silent chain of FIG. 1.
Figure 3:
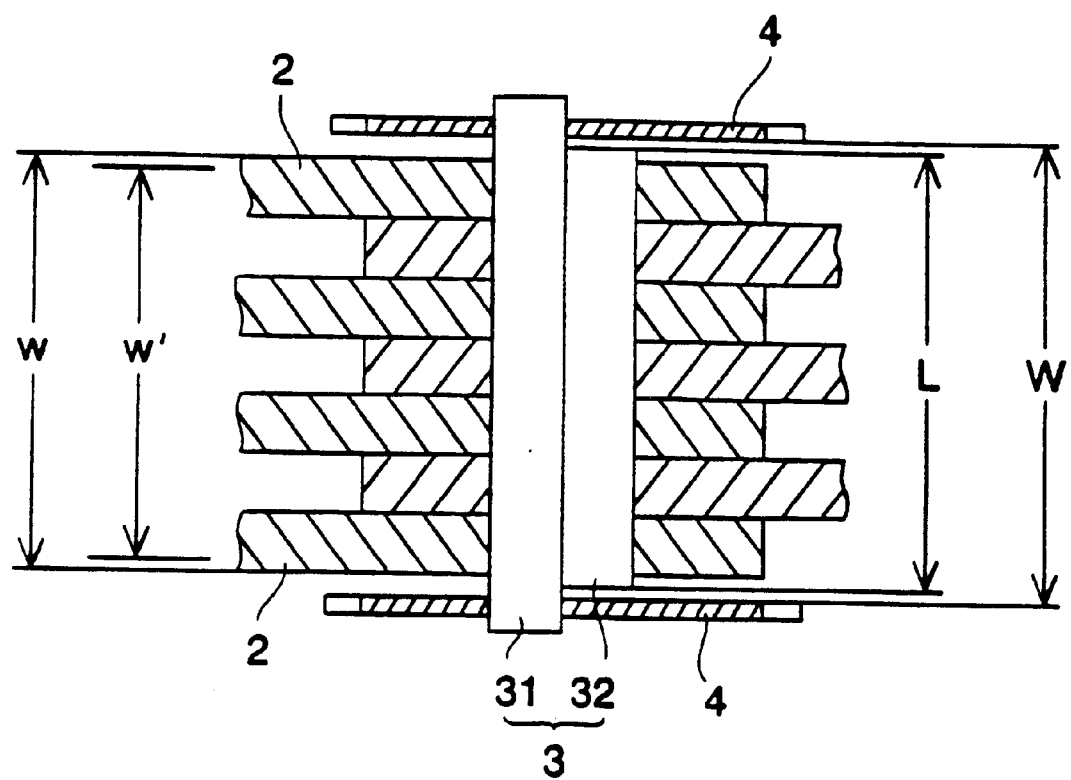
FIG. 3 is a partial enlargement of FIG. 1.
Figure 4:
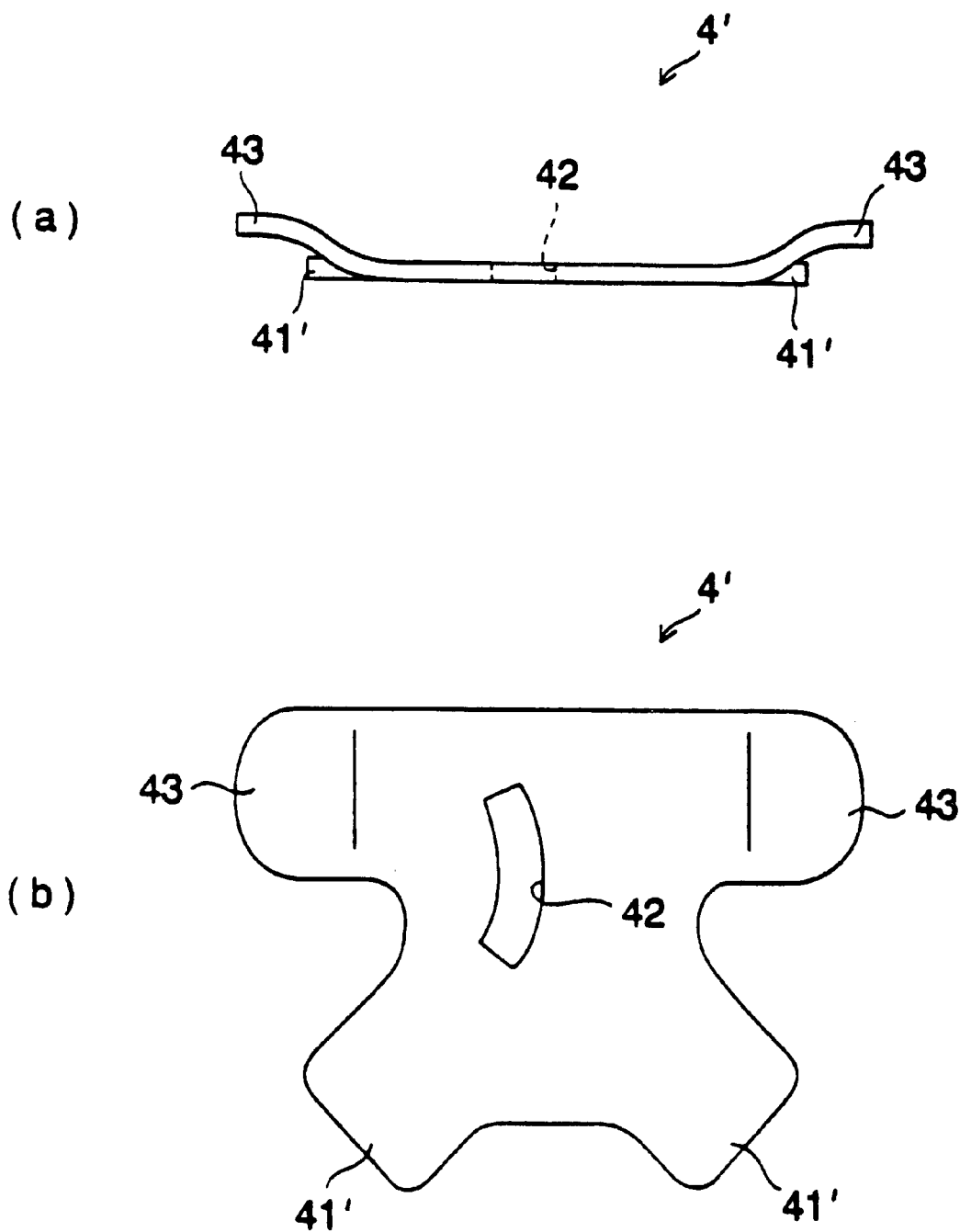
FIG. 4 is modification of the guide washer where (a) is a top view and (b) is a front view.

FIG. 1 is a side view of a silent chain of a practical example of this invention, FIG. 2 is a front view of the silent chain of FIG. 1. FIG. 3 is a partial enlargement of FIG. 1. FIG. 4 shows a modification of the guide washers where (a) is a top view and (b) is a front view.

As shown in FIGS. 1 and 2, silent chain 1 has multiple link plates 2, each of which has a pair of teeth 21 and a pair of pin apertures 22 laminated in the thickness and length directions, and has connecting pin 3 inserted in pin aperture 22 of link plate 2 pivotally supporting link plates. Connecting pin 3 is arcuate cross-section and is composed of joint pin 31 and rocker pin 32. Convex curved faces of pins 31, 32 are opposed in pin aperture 22. Joint pin 31 is longer than rocker pin 32.

Guide washer 4 is placed on the outside of outermost link plate 2. Guide washer 4 is press fitted on connecting pin 3. As shown in FIG. 2, guide washer 4 has a pair of guide parts 41 that extend on both sides of teeth 21 of link plate 2. Such guide parts 41 are provided in order to retain the silent chain at a set position on the sprocket (not shown). Pin aperture 42 is formed at the center of guide washer 4 and the end of joint pin 31 is inserted and fixed in pin aperture 42 by staking, etc.

The shape and position of pin aperture 42 in guide washer 4 is different among adjacent guide washers (see FIG. 2), but proper placement of the pin aperture 42 and use of the back side and front side of the guide washer enables the use of one type of guide washer for the purpose of all guide washers 4.

The length of rocker pin 32 is detailed with FIG. 3. FIG. 3 is a partial enlargement of FIG. 1 and the gap between outermost link plate 2 and guide washer 4 is exaggerated for the convenience of explanation.

In FIG. 3, when the total length of rocker pin 32 is given as L, the total width of interleaved link plates 2 as w, the maximum length of rocker pin 32 as it is put in the pin aperture of outermost link plate 2 is w' (≈w) and the distance between guide washers 4, 4 is W, the preferable relationship is $$w' \leq L < W, \text{ preferably } w \leq L < W.$$

Incidentally, w'≈w indicates that w' is shorter than but close to w.

That is, total length L of rocker pin 32 is equal to or longer than the maximum length w' of rocker pin 32 as it is placed in the pin aperture of outermost link plate 2 and shorter than the distance between guide washers 4, 4 which oppose each other in the chain width direction. Preferably, the total length L of rocker pin 32 is equal to or longer than total width w of laminated link plates 2 and shorter than the distance W between guide washers 4, 4.

In this case, guide washer 4 is placed independently for each connecting pin 3 so that attachment of guide washer 4 is not impeded, even if the total length L of rocker pin 32 is slightly longer than the total width of laminated link plates 2. Thereby the tolerance on the length of rocker pin 32 is less strict for easier dimensional control.

Figure 5:
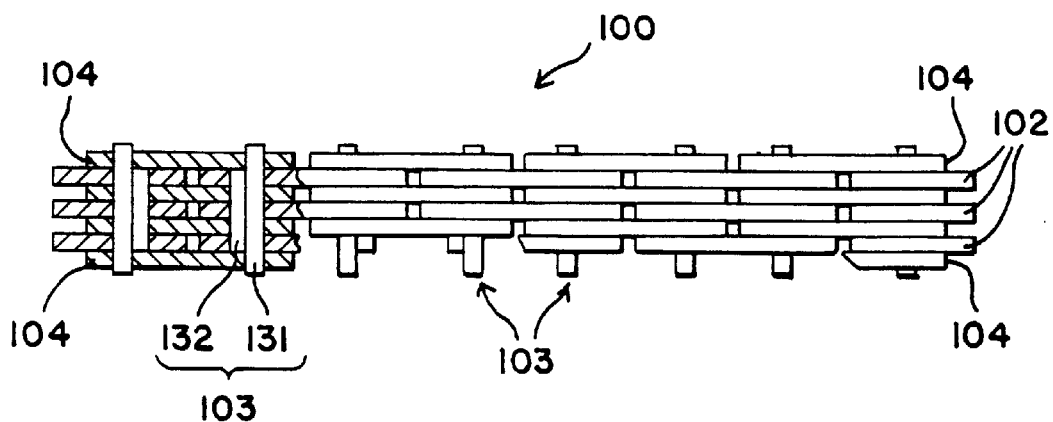
FIG. 5 is a partial side view of a conventional silent chain.
Figure 6:
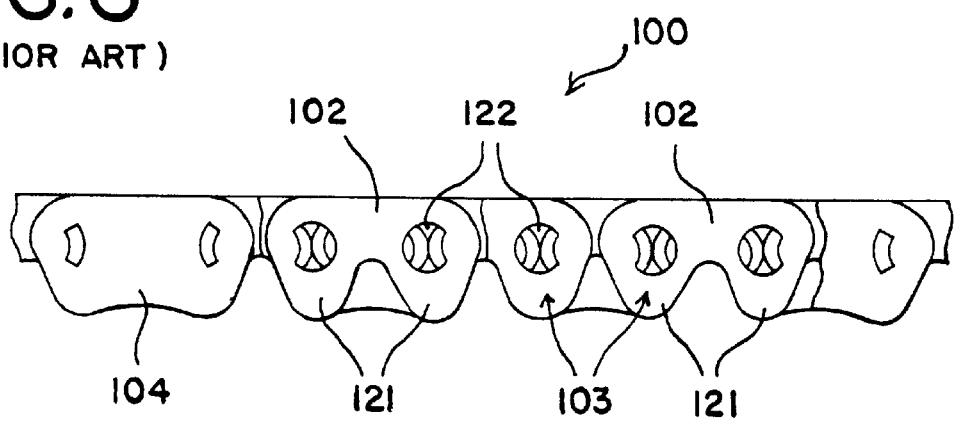
FIG. 6 is a partial front view of a conventional silent chain.

Whereas in a conventional silent chain the guide link has a pair of pin apertures at both its ends (see FIGS. 5 and 6) so that the total length L of the rocker pin need not exceed the total width w of the laminated link plates if the guide link is to be attached without force, even when the lengths of the rocker pins in the pin apertures are different from each other.

In this case, the two ends of the rocker pins must not be too deep in the pin aperture in the outermost link plate, therefore the total length of the rocker pin needs to be close to the total width of the link plates. That is, in a conventional silent chain, the relationship $$w' \leq L < w$$

must be satisfied.

As shown above, w' and w differ little in length so that the tolerance on the length of the rocker pin for a conventional silent chain is tight and dimensional control is not easy.

In this practical example, guide washer 4 is provided to each connecting pin 3 and the end of center pin 31 is fixed to the pin aperture 42 of guide washer 4. Thereby, the shear load from the link plates 2 acts on joint pin 32 because the aperture pitch in the guide row is not restricted, even when excessive tensile load such as a prestressing load is applied to the chain and no bending load acts on joint pin 32 so that bending of joint pin 32 and rocker pin 31 is prevented.

Incidentally, the guide washer is a flat plate in the said practical example but blade-spring-like guide washer 4', as shown in FIG. 4, can be used, too. In this figure, the same numerals as in the earlier practical example indicate corresponding parts.

Guide washer 4' in FIG. 4 has a pair of rectangular guide parts 41'. Guide washer 4', having blade spring 43 that bends up and down and extends to both sides, is formed in it. In this case, the elastic force of blade spring 43 in the chain width direction generates a frictional force between adjacent link plates to increase the bending resistance of the chain and to suppress its chordal vibration and, as a result, noise due to vibration is reduced.

As detailed above, the silent chain of this invention has a guide washer provided to each connecting pin so that stretching of the aperture pitch in the guide row is not restricted, even when excessive tensile load such as a prestressing load is applied to the chain. The shear load from the link plate acts on the joint pin and no bending load acts on the joint pin. As a result, bending of the joint pin and rocker pin is prevented.

What is claimed is:

1. A silent chain, comprising:

a plurality of interleaved rows of link plates, pin members connecting adjacent rows of link plates, each said link plate defining a pair of apertures for receiving said pin members, each said link plate having a pair of teeth extending therefrom, each said pin member including a rocker pin and joint pin, said joint pin having a greater length than that of said rocker pin, said rocker pin and said joint pin being arcuate in cross-sectional shape, a plurality of guide washers, each of said guide washers corresponding to each pin member and being press-fitted on the ends of the joint pins, each guide washer having a laterally extending guiding portion and an aperture for receiving said joint pin, each said guide washer being connected to a single joint pin, said guide washer has a downwardly extending skirt portion that extends below the washer aperture and flares outwardly with both ends of said skirt portion extending laterally beyond both sides of said aperture.

2. The silent chain of claim 1 wherein the entire length of each rocker pin is equal to or longer than the entire width of the said rows of link plates.

3. The silent chain of claim 1 wherein the entire length of each rocker pin is shorter than the distance between the opposed guide washers in the chain width direction.

4. The silent chain of claim 1 wherein said downwardly depending skirt portion extends on both sides of one of said pair of teeth of said link plate.

5. The silent chain of claim 1 wherein each said guide washer has only a single aperture.

6. The silent chain of claim 1 wherein each said guide washer is substantially flat in the longitudinal direction.

7. The silent chain of claim 1 wherein the said guide washer includes a blade spring portion, biasing the said link plates in the chain width direction.

8. The silent chain of claim 7 wherein said guide washer is slightly curved in the longitudinal direction.

* * * * *